May 5, 1959
M. W. GOLDMAN
2,885,080
WASTE WATER RENOVATOR
Filed June 13, 1955
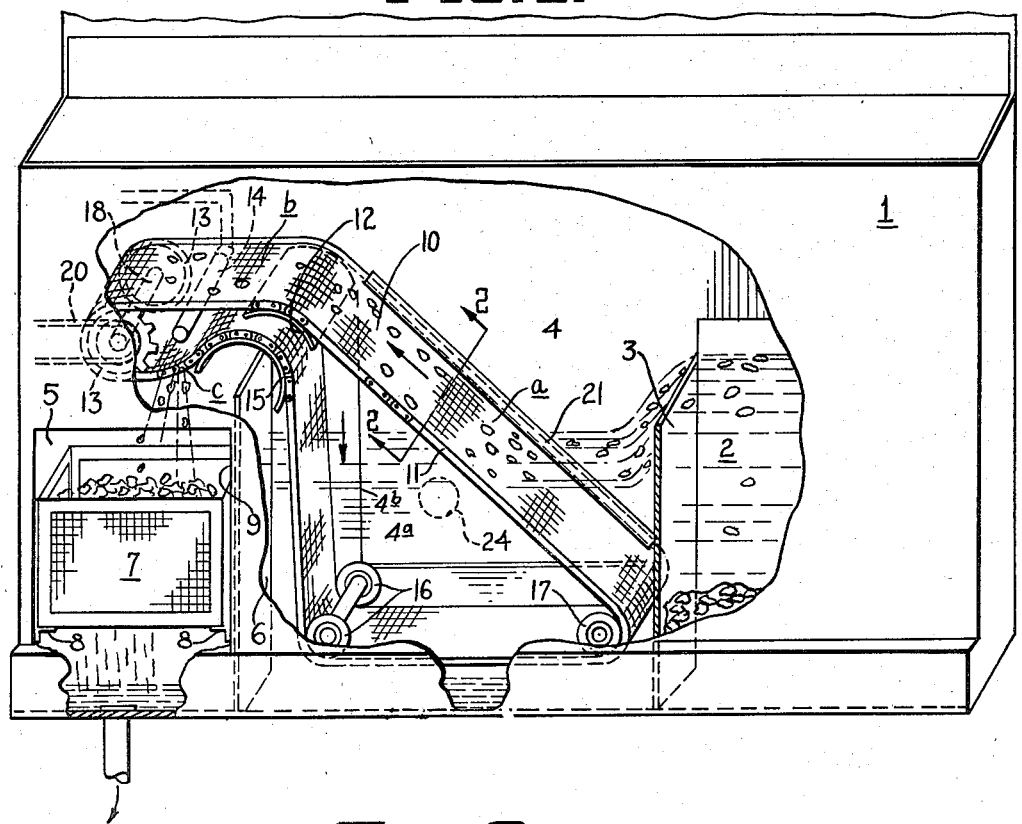
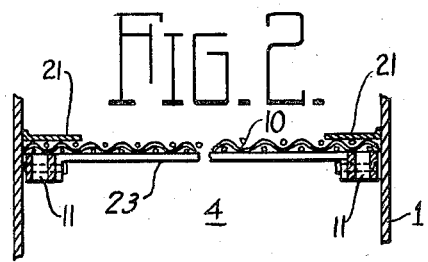
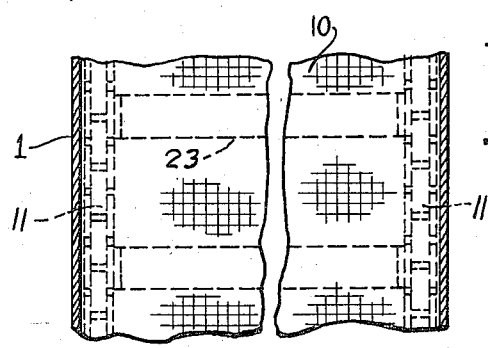
INVENTOR.
Myron William Goldman
BY Owen & Owen,
ATTORNEYS

United States Patent Office 2,885,080
Patented May 5, 1959

2,885,080
WASTE WATER RENOVATOR

Myron William Goldman, Toledo, Ohio

Application June 13, 1955, Serial No. 514,807

1 Claim. (Cl. 210—160)

This invention relates to apparatus for freeing water and other liquids of accumulated floating matter so that the liquid may be used again.

In machines for washing various articles, and particularly in those machines in which the liquid is sprayed on the articles, it is necessary, in order to re-use the liquid, to remove therefrom all lint, shreds, paper and other rafuse resulting from the washing operation, so that the nozzles by which the liquid is sprayed will not become clogged, thereby requiring frequent cleaning and stopping of the machine for the purpose.

The object of the present invention is the provision of a simple and inexpensive liquid cleaning apparatus that will remove all paper and other floating matter from the washing liquid in an efficient and economical manner by the use of an endless moving filtering screen which, after passing through the liquid cleaning zone where it picks up the floating matter, enters a zone where it is sprayed with clean water to remove the picked-up and clinging refuse therefrom. The renovated liquid may be returned to the washing apparatus for further use.

Further objects and advantages of the invention will be apparent from the following detailed description and from the accompanying drawings, in which—

Fig. 1 is a perspective view of a water cleaning apparatus embodying the invention, with the parts broken away;

Fig. 2 is an enlarged section on the line 2—2 in Fig. 1, and

Fig. 3 is a fragmentary plan view of the water cleaning screen, with the side walls of the associated tank in section.

Referring to the drawings, 1 is a vat or tank having at one end a sump 2 into which the waste liquid, hereinafter referred to as water, from the washing machine (not shown) flows and which then passes over a weir plate 3 at one side thereof into a cleaning compartment 4. Any heavy matter in the water, such as bottle caps, falls to the bottom of the sump. The compartment 4 is separated from a refuse compartment 5 by a wall plate 6 which terminates at its top considerably short of the top of the tank but above the level of the weir plate 3 and the normal water line in the compartment 4. An open top refuse receiving container 7 is mounted on tracks 8 in the bottom of the compartment 5 and is removable therefrom through an opening 9 in a side wall.

An endless refuse collecting belt 10 of screen or other suitable foraminous material is disposed in the compartment 4 and has an inclined water cleaning run a traveling upwardly and forwardly on an incline from adjacent to the bottom of the weir plate 3 and serves to collect the floating refuse from the water after they have passed over said plate and during the forward travel of the water in the compartment 4. This belt run intercepts the waste water flow, in the present instance from right to left, and collects on its mesh substantially all of the floating refuse in the water and carries it through a horizontally disposed loop to a point over the container 7 where it is discharged downward from an under downwardly facing run of the belt by a reverse flow of awater spray therethrough.

The belt 10 corresponds in width to that of the vat 1 and rests at its side edges on respective drive chains 11 that move with the belt throughout its travel and preferably have frictional driving engagement with the belt which is free thereon. At the top of the incline run a, the belt and chains pass over a guide 12, arranged over the partition plate 6, and have their courses changed to a horizontal run b extending over the compartment 5 and refuse receptacle 7. The chains and belt then loop down and rearward around sprocket wheels 13 and continue through a rearward run c where a cleaning stream or spray of water is discharged through the belt from a pipe 14 located between the two runs b and c. This discharge is from the inside out or in reverse direction to the flow of water through the belt during the lodging operation of the refuse thereon, thus effectively cleaning the belt of all refuse collected thereby.

At the end of the cleaning run c the belt and chains pass over the partition 6 around a curved guide 15 and down to the bottom of the compartment 4 where they pass around guide sheaves 16 and thence rearwardly at the bottom of the compartment to near the weir plate 3 where they pass around sheaves 17 and begin the inclined run a. The sprocket wheels 13 are carried by a shaft 18 which has driving connection as, for instance, through a chain and sprocket drive 20, with a drive motor or other suitable source of power (not shown).

The side edges of the belt 10 for a distance above and below the water line in the run a are protected by guard strips 21 so that the refuse collecting surface of the belt in this run is restricted to the space between said strips. The strips 21 are preferably hinged to the respective tank sides so they may be turned up out of the way when the belt is being removed or replaced.

The chains 11, 11 are connected at intervals by crossbars 23 (Fig. 2) and these tend to prevent sagging of the belt between the chains in the runs a and b. Below or at the rear of the run a of the belt 10 is a clean water chamber 4$^a$ defined by the line 4$^b$, and from this chamber water is returned to the associated washing machine or other point in any suitable manner as through outlet 24 located in a side wall of said chamber. The top of chamber 4$^a$ is below the flow path of water in the compartment 4 and is enclosed only by the belt 10 so that all water entering the chamber 4$^a$ must pass through the belt screen.

In operation the belt 10 is driven to move slowly through the water in the compartment 4 and its inclined run a intercepts the water flow from right to left through said compartment and collects the floating refuse that passes with the waste water over the weir plate 3 from the sump compartment 2. The collected refuse passes up with the screen belt through the run b, thence around the drive sprockets 13 and rearward over the refuse receptacle 7 before passing over the guide 15 and again down into the compartment 4 to return and again traverse the inclined refuse collecting run a. As the run c passes over the receptacle 7, a cleaning water is discharged preferably in spray form downwardly therethrough at the inner side thereof from a supply pipe 14. This discharge dislodges the paper and other refuse from the belt and directs it into the receptacle 7 which preferably has its walls screened or provided with openings to permit the escape of water therefrom into the bottom of the compartment 5 from which it passes to the drain.

In practice it is found important to guide the belt so as to provide the clean water chamber 4$^a$ within the space between the upper and lower runs so that only water passing through the top run $a$ can enter it. Otherwise the water in the compartment 4 could not be returned to spray nozzles for re-use inasmuch as it would contain lint and fine shreds of material that might not be cleaned from the belt by the spray from pipe 14 and would, therefore, wash off in the tank water. This tank water can only enter the chamber 4ª through the run $a$ of the belt and is, therefore, free of lint and shreds so that only clean water may pass to the spraying parts of the machine for re-use.

I wish it understood that my invention is not limited to any specific construction, arrangement or form of the parts, as it is capable of numerous modifications and changes without departing from the spirit of the claim.

I claim:

In a wash water renovator the combination of a wash tank having a weir plate at one end forming a sump in the tank on the upstream side of said weir plate, said tank having a compartment on the downstream side of the weir plate through which waste water with floating material therein passes, an endless foraminous belt having part of its runs in said compartment, the waste water with floating material therein falling from the top of the weir plate on the cleaning run of the endless foraminous belt, said belt collecting the waste material thereon and delivering it outside of said compartment, the runs of said belt forming a clear water receiving chamber in said compartment with means for discharging the clear water therefrom for reuse.

References Cited in the file of this patent

UNITED STATES PATENTS

| | | |
|---|---|---|
| 658,196 | Whitney | Sept. 18, 1900 |
| 1,564,513 | Bole | Dec. 8, 1925 |
| 1,789,425 | Cabrera | Jan. 20, 1931 |
| 1,812,736 | Butler | June 30, 1931 |
| 1,864,359 | Laughlin | June 21, 1932 |
| 2,095,504 | Kesti | Oct. 12, 1937 |

FOREIGN PATENTS

| | | |
|---|---|---|
| 505,629 | France | May 11, 1920 |